Sept. 5, 1939.  J. R. BALSLEY  2,171,531

SOUND-REPRODUCING SYSTEM

Filed April 22, 1938

INVENTOR.
JAMES R. BALSLEY
BY Wm. S. Pritchard
ATTORNEY.

Patented Sept. 5, 1939

2,171,531

UNITED STATES PATENT OFFICE 2,171,531

SOUND-REPRODUCING SYSTEM

James R. Balsley, Stamford, Conn., assignor to Ozaphane Corporation of America, Stamford, Conn., a corporation of Delaware Application April 22, 1938, Serial No. 203,524

5 Claims. (Cl. 179—100.3)

This invention relates to sound-reproducing systems, and more particularly to a system for reproducing sound from a photographic sound record of the "anti-ground noise", or so-called "noiseless", type, in which the average transmission is proportional to the signal strength.

An object of the invention is to utilize the characteristics of the sound record for increasing the volume range of the reproduced signal with respect to that of the record.

Another object is to produce a novel and improved photo-electric cell which is particularly adapted for use in a system of the above type.

Another object is to provide a photo-electric cell which is responsive to both the average and the instantaneous transmission of the sound record.

Another object is to provide a novel and improved system of the above type, in which a single scanning beam is utilized for obtaining both a signal voltage and a control voltage.

Various other objects and advantages will be apparent as the nature of the invention is more fully disclosed.

Although the novel features which are believed to be characteristic of this invention will be more particularly pointed out in the claims appended hereto, the invention itself will be better understood by referring to the following description, taken in connection with the accompanying drawing, in which certain specific embodiments thereof have been set forth for purposes of illustration.

In the following description and in the claims certain specific terms are used for convenience in referring to various details of the invention. It is to be understood, however, that these terms are to be interpreted as broadly as the state of the art will permit.

Figure 1:
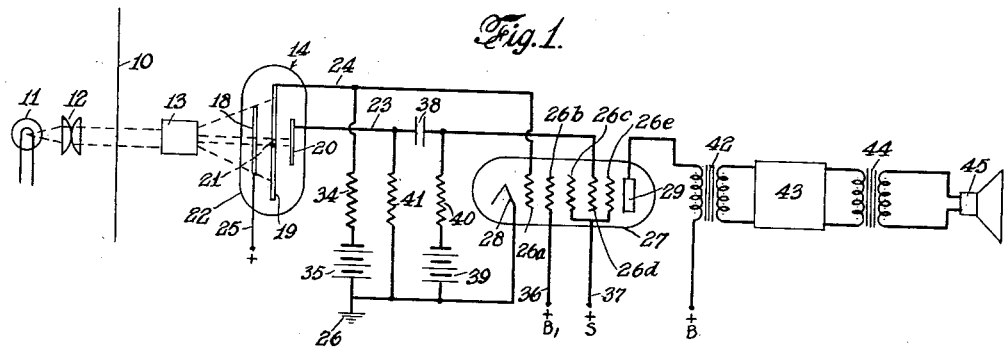
Figure 1 is a diagrammatic representation of a system embodying the present invention.

Referring to the drawing more in detail, the invention as shown in Figure 1 is applied to a system for scanning a film 10 containing a photographic sound record of the "anti-ground noise" type above referred to. The sound record is scanned by means of a light beam from a source 11 which is concentrated by a condenser lens 12 and is passed through the film 10 and through an objective lens 13 by which it is projected onto a photo-electric cell 14.

Figure 2:
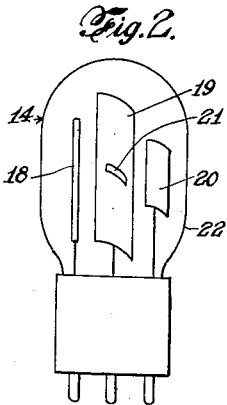
Figure 2 is a detail view of the photo-electric cell shown in Figure 1.

The photo-electric cell 14 is of the emissive type and comprises an anode 18, a control cathode 19, and a signal cathode 20. The control cathode 19, as shown in Figure 2, is of substantial area and is provided with an elongated slit 21 in a position registering with the signal cathode 20 so that a narrow beam of light passes through this slit onto the signal cathode. The electrodes may be enclosed in a glass housing 22 of the usual type.

The anode 18 may be connected to a suitable source of positive potential, as indicated at 25. The control cathode 19 may be connected by a lead 24 to the first grid 26a of a pentagrid tube 27 which may be of standard construction and may comprise, for example, a 6A8 pentagrid converter. The tube 27 may be provided with a cathode 28 of usual construction, five grids 26a, 26b, 26c, 26d and 26e, and an anode 29. Control potential may be applied to the first grid 26a by means of a high resistance 34 which is connected between the grid 26a and the cathode 28 through a source of current 35, such as a battery. The cathode 28 may be grounded at 26 in the usual manner. The second grid 26b of the tube 27 may be connected to the usual source of positive potential indicated at 36. The third and fifth grids 26c and 26e may be connected as screen grids to a standard source of positive screen potential as indicated at 37.

The signal cathode 20 is shown as connected by a lead 23 to the fourth or signal grid 26d through a condenser 38. Suitable operating potential may be applied to this signal grid by means of a source 39, such as a battery, connected through a resistance 40. The signal potential is impressed upon the signal grid 26c by means of a resistance 41 connected between ground and the signal cathode 20 of the cell 14. The condenser 38 is adapted to pass signal voltage variations, but prevents the direct current component in the signal cathode circuit of the cell 14 from affecting the operation of the tube 27.

The anode 29 of the tube 27 may be connected through a transformer 42 to an amplifier 43 by which the signal energy may be amplified as desired and may then be impressed, through a transformer 44, onto a speaker 45 of any standard type.

In the operation of this system, light from the source 11 is passed, as a beam having a substantial cross-sectional area, through the photographic sound record on the film 10. A portion of the sound record is thus projected by means of the objective lens 13 onto the control cathode 19 of the photo-electric cell 14. This projected portion may correspond in area to a plurality of individual sound waves, so that the intensity thereof is proportional to the average sound intensity over an appreciable time interval. A control voltage is thus impressed upon the control grid 26a of the tube 27 which is proportional to the average transmission of the film, which in turn is proportional to the average sound intensity integrated over an appreciable period of time.

A portion of the light applied to the control cathode 19 passes through the slit 21 onto the signal cathode 20. This portion corresponds in width to the usual scanning ray by which a photo-electric sound record is scanned. Inasmuch as the image of the sound record is magnified on the control cathode 19, however, the slit 21 may be wider than the usual scanning area by an amount proportional to the magnification of the image. As an example, if the record is normally adapted to be scanned by a light beam not over .001 inch in width, and the image of the sound record is magnified twenty times on the control cathode, the slit 21 may have a width of .02 inch. It is evident that this increased width greatly increases the accuracy of control. It is further evident that the width of the slit 21 may be reduced as desired, so that the effect of an extremely narrow scanning beam may be obtained. The beam which is applied to the signal cathode 20 is modulated in accordance with the signal wave on the sound record. A signal voltage is thus produced, which is applied through the condenser 38 to the signal grid 26d of the tube 27.

It will be noted that the output of the tube 27 is controlled by both the control grid 26a and the signal grid 26d. A double control is thus effected which produces a variation in the output signal proportional to the instantaneous signal voltage and to the average signal voltage over an appreciable period of time. When the signal is increased the average transmission is increased and vice versa. Consequently the volume range of the reproduced signal varies more in proportion than that of the original sound record. This expansion of volume range is adapted to compensate for the inherent volume compression which is produced in recording. The output energy of the tube 27 is amplified as desired in the amplifier 43 and is impressed upon the speaker 45 in the usual manner.

It will be noted that in this system the volume range of the reproduced signal is expanded, utilizing the inherent characteristics of the sound record and the inherent characteristics of the photo-electric cell above described for producing both the control voltage and the signal-voltage.

Figure 3:
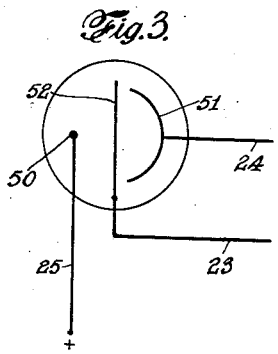
Figure 3 is a top plan view of a different type of photo-electric cell which may be used in place of the cell shown in Figure 1.
Figure 4:
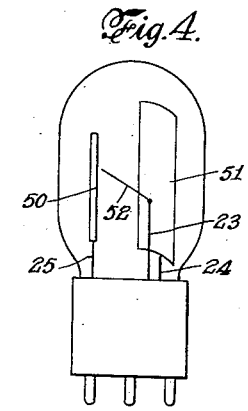
Figure 4 is a side elevation of the cell shown in Figure 3.

Referring to the embodiment of the invention shown in Figures 3 and 4, a photo-electric cell is shown which comprises an anode 50 and a cathode 51 of the usual construction. A narrow cathode 52, such as a wire, is disposed between the anode 50 and the cathode 51 and extends horizontally at about the midpoint of the cathode 51. In this embodiment the narrow cathode 52 constitutes the signal cathode which is connected to the lead 23 and the cathode 51 constitutes the control cathode which is connected to the lead 24. The circuit is otherwise similar to that shown in Figure 1. When a light beam is projected onto the cell of Figures 3 and 4, as described above, the cathode 51 develops a control potential which varies in accordance with the average transmission of the record, and the narrow cathode 52 develops a voltage fluctuating at signal frequency.

Figure 5:
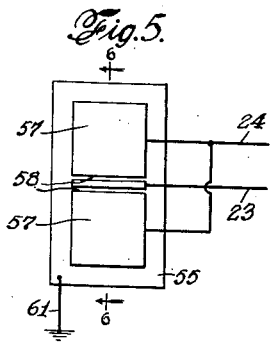
Figure 5 is a top plan view of a photo-electric cell of the barrier layer type suitable for use in the system of Figure 1.
Figure 6:
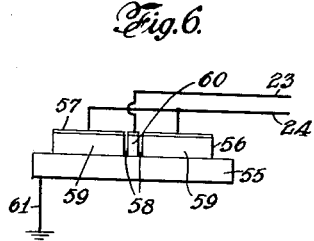
Figure 6 is a section taken along line 6—6 of Figure 5.

In Figures 5 and 6 the invention is shown as applied to a photo-electric cell of the barrier layer type. This cell comprises a base 55 which may be made of any suitable metal. A block 56 of photo-sensitive material, such as selenium, is disposed on this base 55, and a thin transparent metal coating 57 is disposed over the block of selenium 56. The block 56 and the metal layer 57 may be separated by a pair of slots 58 which may, for example, comprise a pair of saw cuts, to form a pair of large blocks 59 and a single narrow block 60. The base 55 may be connected to ground, as at 61, the portions of the metal layer 57 disposed on the large blocks 59 may be connected to the lead 24 of Figure 1, and the portion of the metal layer 57 disposed on the narrow block 60 may be connected to the lead 23 of Figure 1. In this type of cell a voltage is developed at the junction of the selenium and the metal layer 57 which is dependent upon the intensity of the light applied to the selenium through said metal layer.

In the embodiment shown, the image of the sound record is projected upon the entire top surface of the metal layer 57. The portion of this metal layer disposed on the large blocks 59 accordingly receives light having a value corresponding to the average transmission of the film, whereas the narrow block 60 receives only a narrow band of light corresponding to the width of a scanning beam. The signal voltage is thus developed by the block 60 and a control voltage is developed by the blocks 59 which may be connected to the leads 23 and 24, respectively, of Figure 1, for actuating the amplifying system shown therein.

Figure 7:
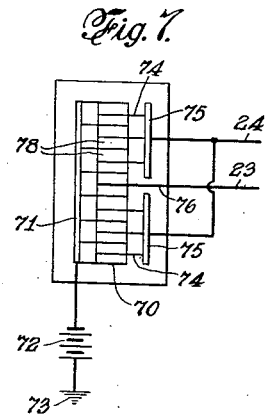
Figure 7 is a top plan view of a photo-conductive cell which is adapted for use in the system of Figure 1.

In Figure 7 the invention is shown as applied to a photo-conductive cell. In this embodiment the cell comprises a plurality of spaced vanes 70 connected to a bridge 71 and thence through a battery 72 to ground, as at 73. Two sets of spaced vanes 74 are interposed between certain sets of the spaced vanes 70 and are connected by bridges 75 to the lead 24 of Figure 1. A single vane 76 may be interposed between a pair of the vanes 70 at the center of the cell and may be connected to the lead 23 of Figure 1. Blocks 78 of selenium may be disposed in the spaces between the vanes 70, 74 and 76.

In this type of cell the conductivity of the selenium varies in accordance with the light intensity. When the image of the sound record is projected upon the cell in the manner described above, the current variations in the circuit including the vanes 74, bridges 75 and lead 24 correspond to variations in the average transmission of the record, whereas the current variations in the circuit including the vane 76 and the lead 23 correspond to the signal. Signal and control voltages are thus developed which may be used for operating the amplifier system, as shown in Figure 1. Obviously the signal voltage may be obtained from two or more vanes instead of the single vane 76, as shown for illustration, and this section of the cell need not be located at the center, the essential feature being to obtain both a narrow and a wide active area. The same modifications also apply to the cell of Figures 5 and 6.

Although certain specific embodiments of the invention have been shown and described, it is to be understood that the invention is capable of various uses, and that changes and modifications may be made therein as will appear to a person skilled in the art. The invention is only to be limited in accordance with the following claims when interpreted in view of the prior art.

I claim:

1. A scanning system for use with a photographic sound record of the type in which the average transmission varies in accordance with sound intensity, said system comprising a photo-electric cell having an electrode of substantial area, means projecting a corresponding area of the sound record onto said electrode for obtaining therefrom a control voltage proportional to the average transmission of said record, said cell having a second electrode, means projecting onto said second electrode a narrow band of the record corresponding in width to a scanning band to develop in said second electrode a signal voltage, a signal reproducing means, and means actuating said last means in accordance with the combined effect of said control voltage and said signal voltage so as to expand the volume range of the reproduced signal with respect to that of the record.

2. A scanning system for use with a photographic sound record of the type in which the average transmission varies in accordance with sound intensity, said system comprising a photo-electric cell having an electrode of substantial area, means projecting a corresponding area of the sound record onto said electrode for obtaining therefrom a control voltage proportional to the average transmission of said record, said electrode having a narrow aperture therein corresponding in width to the width of a scanning band, a second electrode disposed in back of said first electrode to receive the portion of the projected image which passes through said aperture, whereby said second electrode is actuated in accordance with variations of said record, a signal reproducing means, and means actuating said last means in accordance with the combined effect of said control voltage and said signal voltage so as to expand the volume range of the reproduced signal with respect to that of the record.

3. A scanning system for use with a photographic sound record of the type in which the average transmission varies in accordance with sound intensity, said system comprising a photo-electric cell having an electrode of substantial area, means projecting a corresponding area of the sound record onto said electrode for obtaining therefrom a control voltage proportional to the average transmission of said record, a second narrow electrode disposed in front of said first electrode and adapted to receive a portion of the projected image corresponding in width to a scanning band to develop in said second electrode a signal voltage, a signal reproducing means, and means actuating said last means in accordance with the combined effect of said control voltage and said signal voltage so as to expand the volume range of the reproduced signal with respect to that of the record.

4. A scanning system for use with a photographic sound record of the type in which the average transmission varies in accordance with sound intensity, said system comprising a photo-electric cell having an electrode of substantial area, means projecting a corresponding area of the sound record onto said electrode for obtaining therefrom a control voltage proportional to the average transmission of said record, a second electrode disposed to receive a narrow band only of said image corresponding in width to the width of a scanning band to develop in said second electrode a signal voltage, a signal reproducing means, and means actuating said last means in accordance with the combined effect of said control voltage and said signal voltage so as to expand the volume range of the reproduced signal with respect to that of the record.

5. The method of reproducing sound from a photographic sound record of the type in which the average transmission varies in accordance with signal strength, which comprises projecting a substantial area of said record, intercepting said substantial area by a photo-electric means to develop a potential corresponding to the average transmission of said record, intercepting a narrow band of said projected area by a second photo-electric means to develop a signal voltage, and utilizing the combined effect of said control voltage and said signal voltage to produce a signal having a volume range which is expanded with respect to the indicated volume range of said record.

JAMES R. BALSLEY.